United States Patent
L'Ecuyer et al.

(10) Patent No.: US 11,777,804 B2
(45) Date of Patent: Oct. 3, 2023

(54) AUTOMATIC SYSTEM PROVISIONING FOR NVME-OVER-FABRIC STORAGE

(71) Applicant: HEWLETT PACKARD ENTERPRISE DEVELOPMENT LP, Houston, TX (US)

(72) Inventors: Brian Peter L'Ecuyer, Elk Grove, CA (US); Charles Tuffli, Roseville, CA (US); Giuseppe Scaglione, Granite Bay, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 744 days.

(21) Appl. No.: 16/437,691

(22) Filed: Jun. 11, 2019

(65) Prior Publication Data

US 2020/0396126 A1     Dec. 17, 2020

(51) Int. Cl.
*H04L 41/08*   (2022.01)
*G06F 13/16*   (2006.01)
(Continued)

(52) U.S. Cl.
CPC ...... *H04L 41/0876* (2013.01); *G06F 13/1668* (2013.01); *G06F 13/4027* (2013.01);
(Continued)

(58) Field of Classification Search
CPC ............ H04L 41/0876; H04L 12/4633; H04L 12/4641; H04L 49/25; H04L 49/356;
(Continued)

(56) References Cited

U.S. PATENT DOCUMENTS 8,424,053 B2   4/2013   Gottimukkala et al.
8,705,342 B2   4/2014   Yu et al.
(Continued)

FOREIGN PATENT DOCUMENTS

JP   2016-528809 A     9/2016
KR   10-2018-0134745 A   12/2018
WO   2017/176775 A1    10/2017

OTHER PUBLICATIONS

Intel®, "Intel® Rack Scale Design (Intel® RSD) Pooled System Management Engine (PSME)", User Guide Software v2.4, Revision 001, Apr. 2019, pp. 1-81.
(Continued)

*Primary Examiner* — Ashley Shivers
(74) *Attorney, Agent, or Firm* — Nolte Intellectual Property Law Group

(57) ABSTRACT

A network switch is provided. The network switch may incorporate resources for use as network attached resources for remote devices. Resources may include SSD storage for use as network attached storage for remote devices. The network switch may also include one or more client applications configured to detect an intended access path between a remote device and a non-volatile memory express (NVMe) storage device. The intended access path may be based on one of many different NVMe over fabric (NVMe-oF) protocols. The network switch (via the one or more client applications) automatically configures parameters to provide a network connectivity path between the remote device and the NVMe storage device. Communication includes at least one of a virtual local area network (VLAN) and a communication tunnel and/or other form of dedicated communication path to facilitate remotely accessible storage capacity provided from the network switch to the remote device.

20 Claims, 9 Drawing Sheets

(51) Int. Cl.
  *H04L 12/46* (2006.01)
  *H04L 49/356* (2022.01)
  *H04L 49/25* (2022.01)
  *G06F 13/40* (2006.01)
  *H04L 67/1097* (2022.01)

(52) U.S. Cl.
  CPC ...... *H04L 12/4633* (2013.01); *H04L 12/4641* (2013.01); *H04L 49/25* (2013.01); *H04L 49/356* (2013.01); *H04L 67/1097* (2013.01)

(58) Field of Classification Search
  CPC ............. H04L 67/1097; H04L 41/0806; H04L 41/0886; G06F 13/1668; G06F 13/4027; G06F 3/0605; G06F 3/0635; G06F 3/067; G06F 3/0679
  See application file for complete search history.

(56) References Cited

U.S. PATENT DOCUMENTS

| | | | |
|---|---|---|---|
| 9,491,201 | B2 | 11/2016 | Bagepalli et al. |
| 9,634,944 | B2 | 4/2017 | Chinnaiah et al. |
| 9,686,203 | B2 | 6/2017 | Decusatis et al. |
| 9,692,560 | B1 | 6/2017 | Galon et al. |
| 9,747,249 | B2 | 8/2017 | Cherian et al. |
| 9,990,139 | B2 | 6/2018 | Nadakuditi et al. |
| 10,572,180 | B1 * | 2/2020 | Nemawarkar ........ G06F 3/0659 |
| 11,042,302 | B2 | 6/2021 | Benisty |
| 2007/0100979 | A1 | 5/2007 | Soland et al. |
| 2007/0297333 | A1 | 12/2007 | Zuk et al. |
| 2008/0148270 | A1 | 6/2008 | Gopisetty et al. |
| 2008/0256239 | A1 | 10/2008 | Gilde et al. |
| 2011/0019669 | A1 | 1/2011 | Ma et al. |
| 2015/0026794 | A1 | 1/2015 | Zuk et al. |
| 2015/0248366 | A1 | 9/2015 | Bergsten et al. |
| 2015/0370742 | A1 | 12/2015 | Breakstone et al. |
| 2017/0177216 | A1 | 6/2017 | Freyensee et al. |
| 2017/0177541 | A1 | 6/2017 | Berman et al. |
| 2019/0004988 | A1 | 1/2019 | Elkington et al. |
| 2019/0089639 | A1 | 3/2019 | Dhanabalan |
| 2019/0102093 | A1 * | 4/2019 | Parnell ................ G06F 11/2007 |
| 2019/0114278 | A1 | 4/2019 | Olarig et al. |
| 2020/0117525 | A1 * | 4/2020 | Kachare .............. G06F 11/3027 |
| 2020/0326868 | A1 * | 10/2020 | Yang .................. G06F 13/1668 |
| 2021/0111996 | A1 | 4/2021 | Pismenny et al. |

OTHER PUBLICATIONS

International Search Report and Written Opinion received for PCT Application No. PCT/US2019/038892, dated Mar. 23, 2020, 10 pages.
International Search Report and Written Opinion received for PCT Application No. PCT/US2019/034550, dated Feb. 28, 2020, 10 pages.
CISCO, "Best Practices for Oeployrnents Using DCB and RoCE," White Paper, Jun. 20, 2015, 23 pages, https://www.roceinitiative.org/wp-content/uploads/2016/11/elx_wp_all_best_practices_deployments_dcb_roce_cisco.pdf.
Hampel, D., "New Storage Infrastructure with Flash and NVMe Over Fabrics," 2017, 56 pages, Brocade Communications Systems, Inc.
ARISTA, "Deploying IP Storage Infrastructures," ARISTA White Paper, 2014, https://solutions.arista.com/hubfs/Arista/White_Papers/Deploying_Storage_Net_WhitePaper.pdf.
Cisco, "Cisco MDS 9000 Family Quality of Service," Mar. 30, 2006, https://www.cisco.com/c/en/us/products/interfaces-modules/storage-networking-modules/index.html.
Opportunities from Our Compute, Network, and Storage Inflection Points, (Web Page), Retrieved Dec. 24, 2018, 19 Pgs.
Pavic, N., IBM Pure Systems, (Research Paper), Aug. 16, 2012, 18 Pgs.

* cited by examiner

AUTOMATIC SYSTEM PROVISIONING FOR NVME-OVER-FABRIC STORAGE

BACKGROUND

Some Information Technology departments in corporations have started building their computer infrastructure to be, as much as possible, defined by software. This software-defined infrastructure sometimes relies on a hyperconverged infrastructure (HCl) where different functional components are integrated into a single device. One aspect of an HCl is that components of hardware may be virtualized into software defined, and logically isolated representations of computing, storage, and networking for a computer hardware infrastructure. HCl and virtualization of hardware resources may allow the allocation of computing resources to be flexible. For example, configuration changes may be applied to the infrastructure and the underlying hardware simply adapts to a new software implemented configuration. HCl may further be used by some corporations to implement a virtualized computer by completely defining the computer's capability specification in software. Each virtualized computer (e.g., defined by software) may then utilize a portion of one or more physical computers (e.g., the underlying hardware). One recognized result of virtualization is that physical computing, storage, and network capacity may be more efficiently utilized across an organization.

NVM Express (NVMe) is a data transfer protocol typically used to communicate with Solid-State Drives (SSDs) over a Peripheral Component Interconnect Express (PCIe) communication bus. There are many different types of data transport protocols that exist for different uses within computer systems. Each different transport protocol may exhibit different characteristics with respect to speed and performance and therefore each protocol may be applicable for different uses. NVMe is an example of a data protocol that may be used to enable high-speed data transfer between a host computer system and an SSD. NVMe is commonly used in computers that desire high-performance read and write operations to an SSD. Utilizing NVMe disks capable of supporting high-performance read and write within a software defined infrastructure further utilizing HCl hardware may represent a useful and adaptable configuration for infrastructure networks.

A specification has been developed for running NVMe over fabrics (NVMe-oF). One goal of this specification was extending NVMe onto fabrics such as Ethernet, Fibre Channel, and InfiniBand or any other suitable storage fabric technology. Access to SSD disks over network fabrics via NVMe-oF may allow software defined storage capacity (e.g., portions of a larger hardware storage capacity) to scale for access. This scaling for access may: a) allow access to a large number of NVMe devices; and b) extend a physical distance between devices (e.g., within a datacenter). Scaling may include increasing distances over which NVMe storage devices may be accessed by another computing device. Storage protocols are typically lossless protocols because of the nature of storage goals. If a protocol used for storage is lossy (lossy is the opposite of lossless), proper storage of data is likely going to exhibit unacceptable slowness (e.g., due to packet transmission retries) or even worse may present corruption (e.g., data inaccuracies) and therefore not be useable within a real-world computer environment. NVMe-oF traffic may be used to provide storage for other network devices and thus rely on configuration to establish tunnels or other communication paths between remote devices and network storage devices. This configuration may allocate portions of an HCl infrastructure device to be "assigned" to a remote device. Configurations may change over time as more remote devices come on-line and other remote devices release resources that are no longer needed (e.g., because of an application termination, failure of a remote device, or other reasons). In another example, some remote devices may simply desire to augment storage allocation to increase their overall storage capacity.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
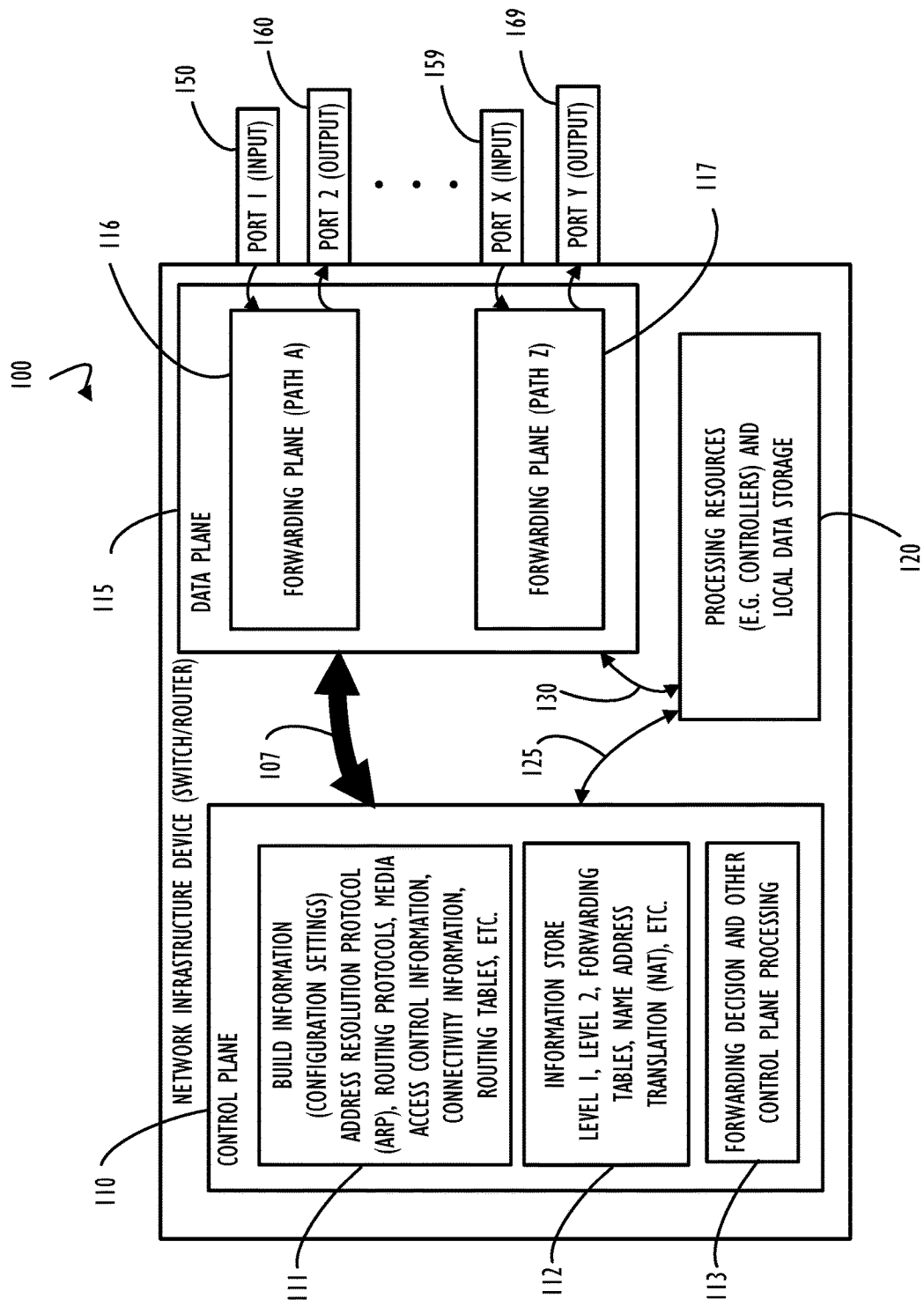
FIG. 1 is a functional block diagram representing an example of a network infrastructure device such as a switch/router, according to one or more disclosed implementations.

Illustrative examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

NVM Express (NVMe) over fabric (NVMe-oF) data access packets are used for lossless communication between a remote device and a storage device. Disclosed techniques identify, through automatic discovery, that a remote device has an access path to the storage device that is not yet configured for that remote device. Based on the discovery, software within a switch may automatically configure one or both of a virtual local area network connectivity or a tunnel over Internet protocol (IP) to provide access for the remote device to communicate to the storage device. In general, all necessary configuration to allow a "plug-n-play" allocation of resources may be automatically performed between a client application and the remote device requesting (or de-allocating) storage resources. Historically, all switch configurations to support NVMe-oF storage devices were at the direction of a system administrator and performed manually. Accordingly, disclosed techniques represent an improvement to the art of system administrations of network storage, in part, by allowing automated configuration to replace operations that were previously performed manually.

As briefly mentioned above, this disclosure describes an improvement over the previously provided methods that may be dependent upon frequent configuration changes (sometimes manual) to the network infrastructure devices. According to disclosed implementations, NVMe-oF network communication paths may be automatically established to allow access to storage provided by a network infrastructure device. For example, storage (e.g., SSDs) may be included in a network switch and client applications executing on the network switch may facilitate (e.g., by automatically establishing proper communication paths and protocols) access to the storage based on configuration attributes of the remote device. There may be different underlying formats of data transfer for NVMe with the recognized abbreviation for NVMe over PCIe being "NVMe/PCIe." NVMe over Fabrics, when used agnostically with respect to the transport, is abbreviated "NVMe-oF." NVMe over remote direct memory access (RDMA) is abbreviated "NVMe/RDMA." NVMe over Fibre Channel is abbreviated "NVMe/FC" and NVMe over transport control protocol (TCP) is abbreviated "NVMe/TCP." As other protocols are associated with NVMe, it is expected that other abbreviations may be defined. As will be apparent to those of ordinary skill in the art, given the benefits of this disclosure, the techniques of this disclosure are applicable to existing and future implementations of transports that may be used in a like manner to the examples of this disclosure.

As used herein, a "client application" executing on a network infrastructure device, such as a switch that incorporates storage, may be implemented using software, firmware, hardware logic (e.g., silicon-based logic), or a combination of these techniques. In general, the combination of functional modules may perform collectively to support a plug-n-play type allocation of resources such that resources (e.g., storage) are automatically allocated or de-allocated for remote devices based on discovery or on-demand requests. Discovery may allow automatic detection of a remote device associating itself to a network (e.g., boot-up, restart, fail-over, etc.). Upon discovery, configuration information, that may have been stored previously, may be exchanged between the remote device and the network infrastructure device to establish allocation of resources. Discovery may also determine a proper protocol to use for communications between the remote device and the network infrastructure device. Different remote devices may use different protocols to concurrently communicate with a single network infrastructure device. Discovery may also detect that resources are no longer in-use by a remote device and reclaim previously allocated resources such that those resources may be returned to a resource pool and made available for other allocation requests.

Referring now to FIG. 1, a network infrastructure device such as a switch/router 100 is illustrated in a block diagram. In general, a switch/router 100 has two types of network element components organized onto separate planes illustrated as control plane 110 and data plane 115. In addition, a typical switch/router 100 may include processing resources and local data storage 120. Depending on the capabilities of a particular switch/router 100, different types of processing resources and local storage (for internal device usage) may be present. In general, higher capacity switch/router 100 implementations will include substantial processing resources and memory while simpler (e.g., low capacity) devices will contain less internal resources. Local storage for internal device usage is not to be confused with attachable or integrated storage devices (e.g., SSDs) for network use as described throughout this disclosure.

Control plane 110, for example, in a router may be used to maintain routing tables (or a single comprehensive routing table) that list which route should be used to forward a data packet, and through which physical interface connection (e.g., output ports 160 through 169). Control plane 110 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 115.

A router may also use a forwarding plane (e.g., part of the data plane 115) that contains different forwarding paths for information from different ports or different destination addresses (e.g., forwarding path A 116 or forwarding path Z 117). In general, The router forwards data packets between incoming (e.g., ports 150-159) and outgoing interface connections (e.g., ports 160-169). The router forwards data packets to the correct network type using information that the packet header contains matched to entries in the FIB supplied by control plane 110. Ports are typically bidirectional and are shown in this example as either "input" or "output" to illustrate flow of a message through a routing path. In some network implementations, a router (e.g., switch/router 100) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 1, bidirectional arrow 107 indicates that control plane 110 and data plane 115 may work in a coordinated fashion to achieve the overall capabilities of switch/router 100. Similarly, bidirectional arrow 125 indicates that processing and local data storage resources 120 may interface with control plane 110 to provide processing and storage support for capabilities assigned to control plane 110. Bidirectional arrow 130 indicates that processing and local data storage resources 120 may also interface with data plane 115 as necessary.

Control plane 110, as illustrated in FIG. 1, includes several example functional control blocks. Additional control blocks are possible depending on the capabilities of a particular implementation of a switch/router 100. Block 111 indicates that control plane 110 may have associated build information regarding a software version of control code that is currently executing on switch/router 100. In addition, that software version may include configuration settings to determine how switch/router 100 and its associated control code perform different functions.

Figure 2A:
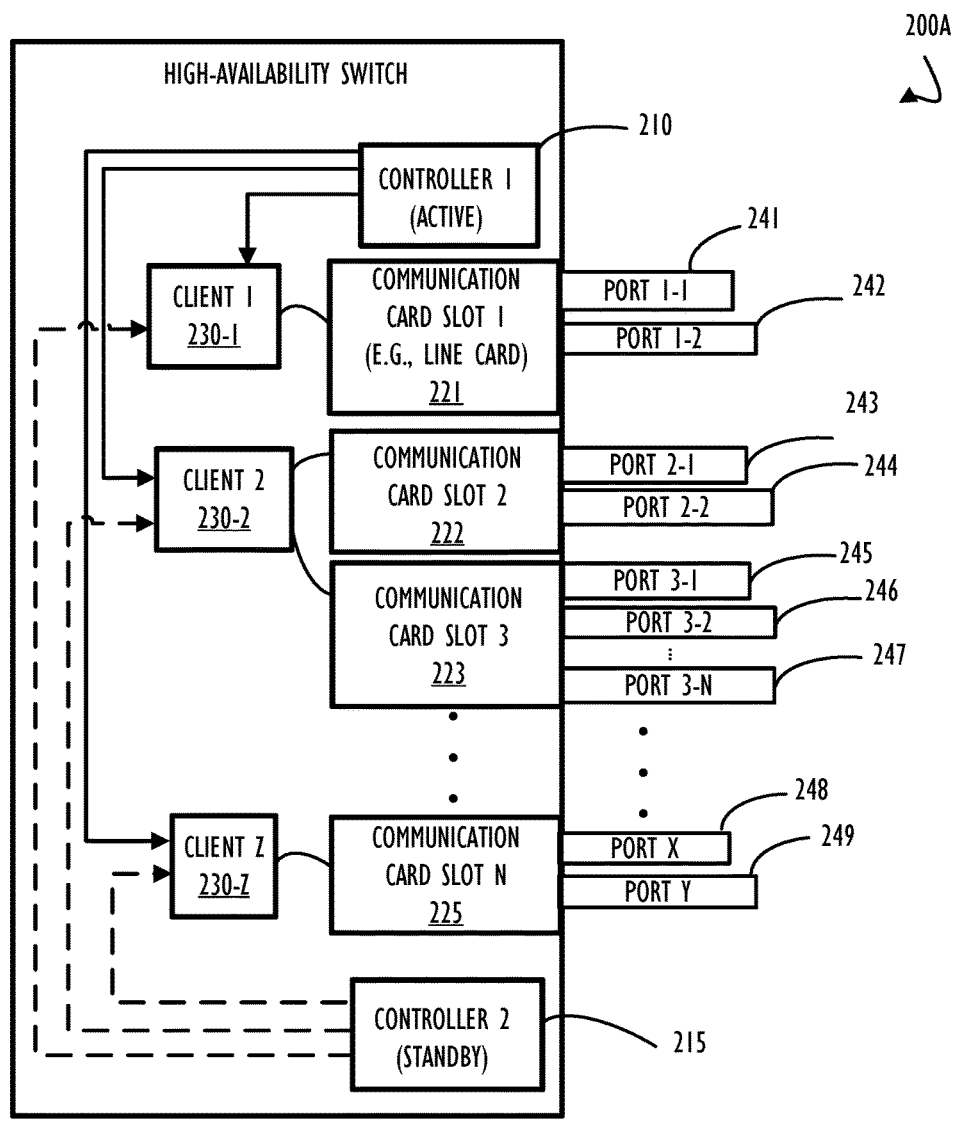
FIG. 2A is a functional block diagram representing an example of a high-availability switch, according to one or more disclosed implementations.
Figure 2B:
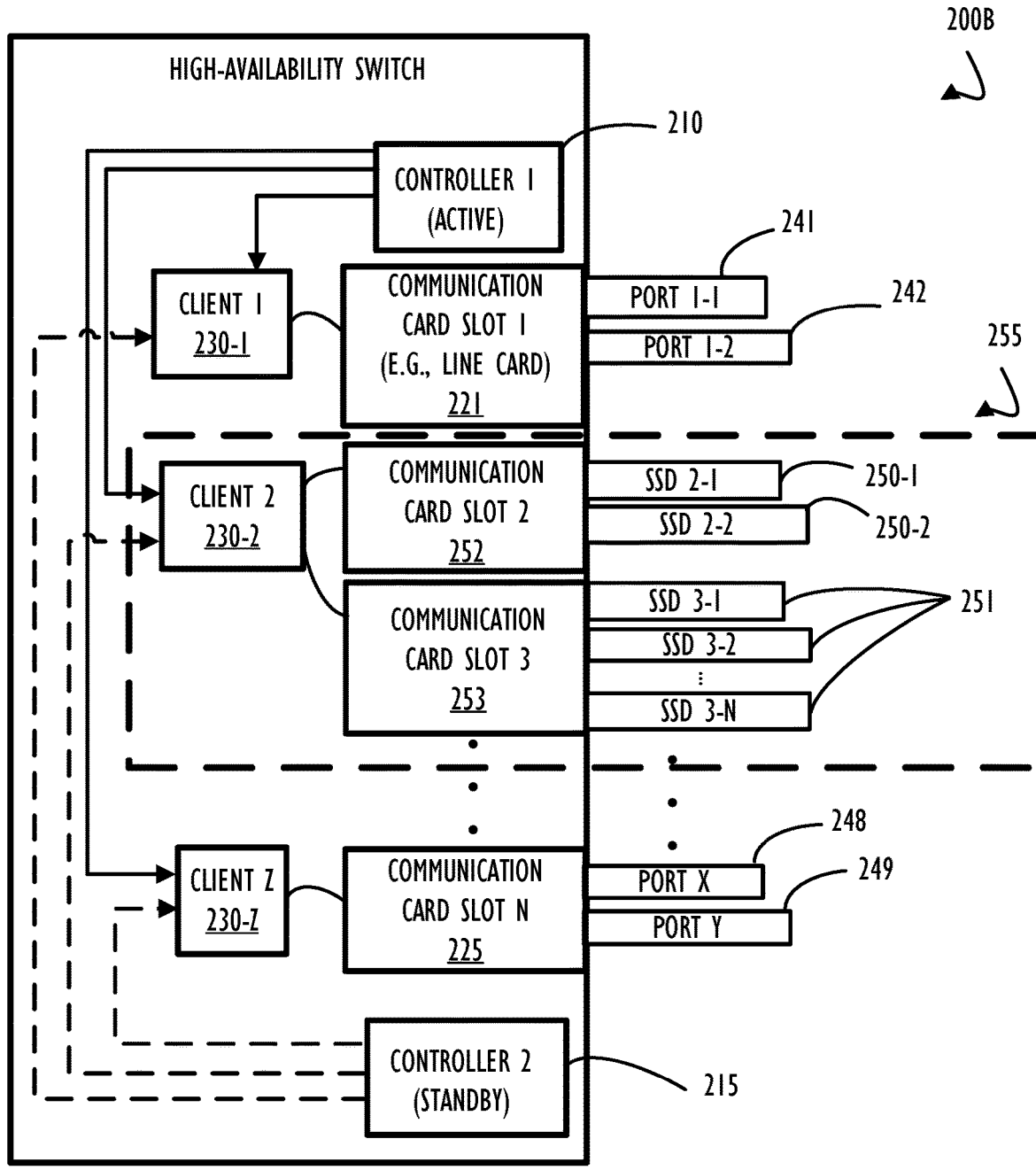
FIG. 2B is a functional block diagram representing an example of a high-availability switch that includes SSD storage capability in addition to (or in place of) some of its network communication capability, according to one or more disclosed implementations.

Many different configuration settings for both the software and the device itself are possible and describing each is beyond the scope of this disclosure, However, the disclosed automatic detection and allocation of storage on behalf of remote devices (e.g., automatic system provisioning) may be implemented in one or more functional components of network infrastructure device such as switch/router 100. Configuration settings may be stored or provided just-in-time to be used to allocate resources for remote devices, establish communication tunnels, provide security for data exchange, and provide other automatic provisioning functions in support of remote devices. Each of these automatic provisioning functions may be incorporated into the one or more functional components illustrated for network infrastructure device (e.g., switch/router 100). Further, in some implementations such as shown in FIGS. 2A-2B, a network infrastructure device 100 (e.g., switch/router 100 or HA switch 200A and 200B) may be composed of multiple devices in different HA configurations. One or more devices in switch/router 100 may be configured to implement the automatic detection and allocation of storage resources as part of the disclosed automatic system provisioning techniques.

Continuing with FIG. 1, block 111 indicates that different types of routing information and connectivity information may be known to switch/router 100 (as an example of network infrastructure device 100) and control plane 110. Block 112 indicates that an information store may be accessible from control plane 110 and include forwarding tables or NAT information as appropriate. Block 113 indicates that control plane 110 may also be aware of forwarding decisions and other processing information, Although FIG. 1 illustrates these logical capabilities within control plane 110 they may actually be implemented outside of, but accessible to, control plane 110.

Referring now to FIG. 2A, an example of a high-availability switch 200A is illustrated in a block diagram. High-availability switch 200A is illustrated with two controllers. Controller 1 (210) is identified as the "active" controller and Controller 2 (215) is identified as the "standby" controller. As explained in more detail below, a high-availability switch, such as high-availability switch 200A, may have any number of controllers and typically has at least two. In some configurations, the controllers work as a primary/backup pair with a dedicated active controller and a dedicated standby controller. In a primary/backup configuration, the primary performs all network functions and the standby, as its name suggests, waits to become the active if a failover condition is reached, Failover may be automatic or manual and may be implemented for different components within a higher-level HA device. In general, failover at a conceptual high level refers to the active and standby component switching roles so that the standby becomes the active and the active (sometimes after restarting or replacement) becomes the standby. In the context of SSD devices integrated into a network switch, one SSD may act as a primary in a redundant pair of SSDs that are kept up to date with data writes such that the backup of the redundant pair may take over (e.g., the backup is a hot standby) automatically when (for any number of reasons) the primary SSD is not available.

High-availability switch 200A also includes a plurality of communication cards (e.g., Card Slot 1 (221), Card Slot 2 (222), Card Slot 3 (223), and Card Slot N (225)) that may each have a plurality of communication ports configured to support network communication. A card slot, such as Card Slot 1 (221) may also be referred to as a "line card" and have a plurality of bi-directional communication ports (as well as a management port (not shown)). Card Slot 1 (221) is illustrated with port 1-1 (241) and port 1-2 (242) and may represent a "card" that is plugged into a slot (e.g., communication bus connection) of a backplane (e.g., communication bus) of high-availability switch 200A. Other connections and connection types are also possible (e.g., cable connection, NVMe device), Also, in FIG. 2A, Card Slot 2 (222) is illustrated with port 2-1 (243) and port 2-2 (244); Card Slot 3 (223) is illustrated with ports 3-1 (245), 3-2 (246), and port 3-N (247); and Card Slot N (225) is illustrated with port X (248) and port Y (249).

To support communications between a controller (e.g., an active and/or a standby controller) in a switch and client devices (e.g., remote devices) connected to that switch, a number of communication client applications may be executing on a given switch. Client applications executing on a switch may assist in both communications to connected clients and configuration of hardware on the switch (e.g., ports of a line card, storage devices integrated within the switch). In some cases, client applications are referred to as "listeners," in part, because they "listen" for a communication or command and then process what they receive. For high-availability switch 200A, an example client application is client 1 (230-1) which is illustrated to support communication from either the active or the standby controller to devices connected through Card Slot 1 (221). In some example implementations, a listener may be configured to automatically identify and route NVMe-oF network packets to support storage for remote devices (and applications executing on those remote devices). Other implementations, where the automatic identification is performed by hardware components or other software components, are also possible. Client applications executing on a switch may be implemented using software, firmware, hardware logic, or a combination thereof.

A second example client application in FIG. 2A is client 2 (230-2) which is illustrated to support communication from either controller to both of Card Slot 2 (222) and Card Slot 3 (223). Finally, client Z (230-Z) is illustrated to support communication from both controllers to Card Slot N (225). Dashed lines in block diagram 200 from standby controller 2 to client applications indicate that the standby controller may be communicatively coupled to a communication card slot via a client application but may not be transmitting significant data because of its standby status. Solid lines in block diagram 200 from active controller 1 to client applications indicate an active status with likely more communication taking place. Also note that a single client may be configured to support more than one (or even part of one) communication Card Slot (line card) as illustrated with client 2 (230-2) supporting both of Card Slot 2 (222) and Card Slot 3 (223) concurrently. Upper limits on the number of card slots supported by a client may be an implementation decision based on performance characteristics or other factors of the switch and its internal design.

Referring to FIG. 2B, a block diagram illustrates HA switch 200B as a variation of HA switch 200A discussed above. As illustrated, in area 255 (outlined by a dashed box), HA switch 200B integrates multiple SSD components that may be used to provide network attached storage for remote devices. As illustrated, SSD devices may be used in place of communication ports for HA switch 200B. Specifically, communication Card Slot 2 (252) integrates SSD 2-1 (250-1) and SSD 2-2 (250-2). To achieve an HA configuration and depending on implementation specifications, SSD 2-1 (250-1) may be paired with SSD 2-2 (250-2) as a redundant pair of storage devices or may be implemented independently from each other. Because both SSD 2-1 (250-1) and SSD 2-2 (250-2) are both on Card Slot 2 (252) it may be desirable to provide a redundant pairing where both a primary and backup of a redundant pair are not on the same line card. Specifically, an SSD may be paired for redundancy with an SSD on a different line card. Either implementation is possible. One possible benefit of having inputs and outputs (or redundancy pairs) on the same line card would be that communication between devices on a same line card would not have to traverse a chassis fabric (i.e., the inter-device communication would be local to the line card fabric). Of course, different implementation criteria may be considered to determine a most optimal implementation for a given application solution. Additionally, it is possible that a single line card may have a combination of integrated SSD components and communication ports.

As also illustrated in example HA switch 200B, a line card may communicate with any number of integrated SSD components. Specifically, area 255 illustrates that SSD 3-1, SSD 3-2, and SSD 3-N (all referenced with element reference number 251) may be integrated with (or connected to) Card Slot 3 (253). In this example, client 2 (230-2) may adapt to communicate with line cards having integrated SSD components and other computing devices (e.g., outside of area 255) may not be aware of detailed implementations within area 255. That is, the disclosed implementation of SSD components integrated within HA switch 200B may be transparent to external devices and other components of HA switch 200B. Although client 2 (230-2) is illustrated in block diagram 200B as a potential software (or firmware) module, it is possible to implement functionality of client 2 (230-2) completely (or at least partially) within hardware logic (i.e., silicon based logic) of HA switch 200B. One of ordinary skill in the art, given the benefit of this disclosure, will recognize that many different implementations of software, firmware, and hardware logic may be used to achieve disclosed techniques of automatically provisioning communication flows for network attached storage devices (NVMe-oF devices in particular).

Figure 3:
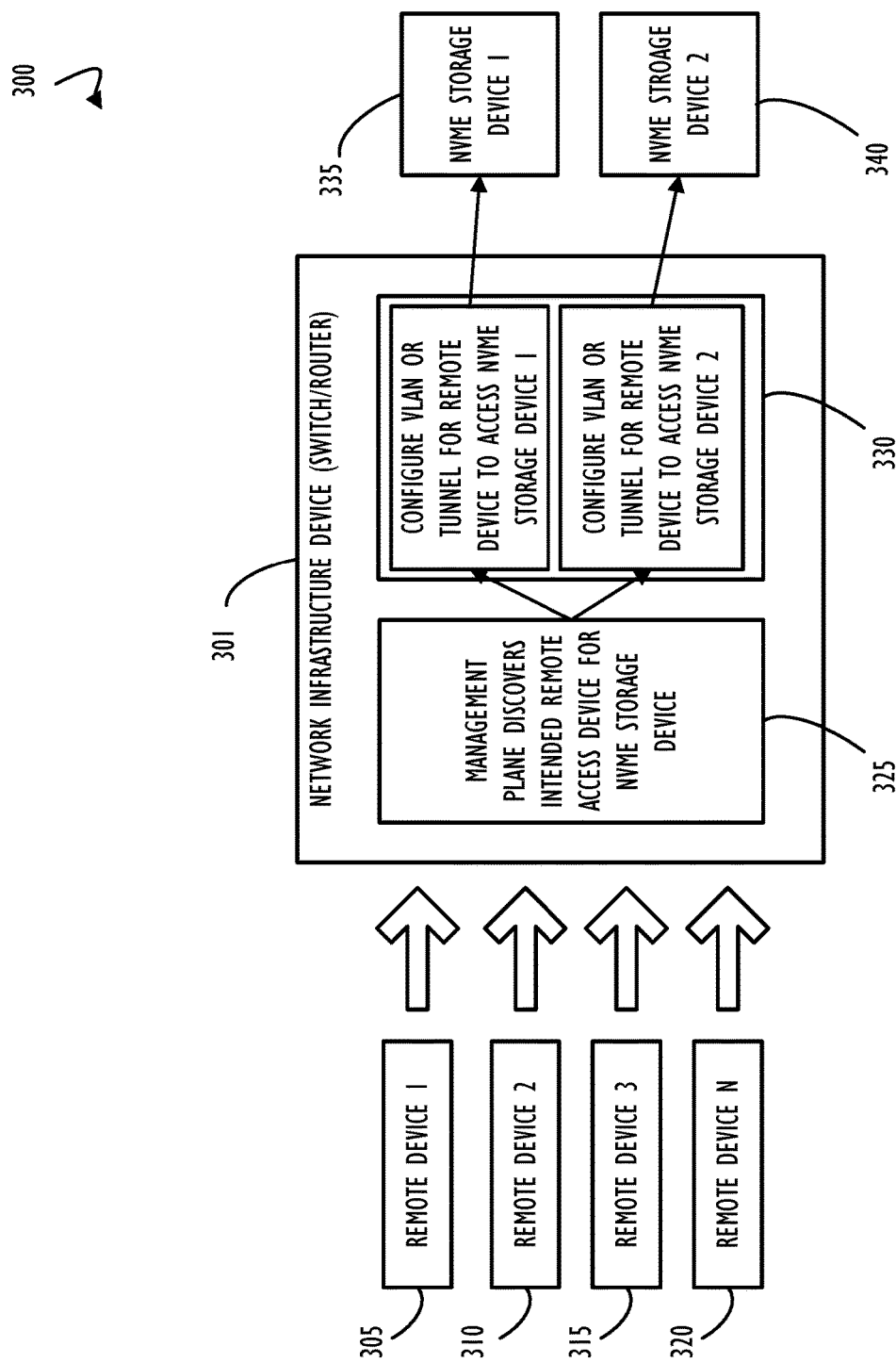
FIG. 3 is a block diagram representing an example of automatic configuration (e.g., allocation) of storage for a plurality of remote devices with respect to storage capability provided by a network infrastructure device, according to one or more disclosed implementations.

Referring now to FIG. 3, an example of network infrastructure device (switch/router) 301, configured in accordance with disclosed techniques to perform automatic provisioning of NVMe-oF storage devices, is illustrated. As shown, any number of remote devices may connect to network infrastructure device (switch/router) 301 and request resources in the form of remote storage. For example, remote device 1 (305) may be configured to obtain one or more logical volumes of storage upon boot-up from network infrastructure device (switch/router) 301. Each of remote device 2 (310), remote device 3 (315), and remote device N (320) may similarly utilize resources made available via network infrastructure device (switch/router) 301. Each remote device may be "discovered" upon connection to a network that communicatively couples each remote device to the network infrastructure device (switch/router) 301 and in-turn to NVMe storage device 1 (335) and/or NVMe storage device 2 (340). Upon discovery of a connected remote device (or upon request from an already connected remote device), management plane 325 may determine an association for the remote device and an NVMe storage device that will use NVMe-oF protocol(s) to perform storage operations (e.g., read/write data to an SSD). Each of NVMe storage device 1 (335) and NVMe storage device 2 (340) may be integrated within network infrastructure device (switch/router) 301 (as also illustrated in FIG. 2B) or may be connected to network infrastructure device (switch/router) 301 via a cable (or communication bus). In either case, network infrastructure device (switch/router) 301, when configured in accordance with disclosed auto provisioning techniques, may be responsible for allocating all (or a portion of) resources provided by the communicatively coupled storage component.

To facilitate lossless communication between each remote device (305-320) and an associated NVMe storage device (e.g., NVMe storage device 1 (335) and/or NVMe storage device 2 (340)), functional block 330 illustrates that network infrastructure device (switch/router) 301 may include functional modules (e.g., client applications as discussed above) to configure a virtual local area network (VLAN) or tunnel that allows each remote device to have access (perhaps dedicated access) to storage. Thus, upon determination that a remote device desires access to storage, network infrastructure device (switch/router) 301 may automatically provision a portion of available storage in support of the remote device.

Figure 4:
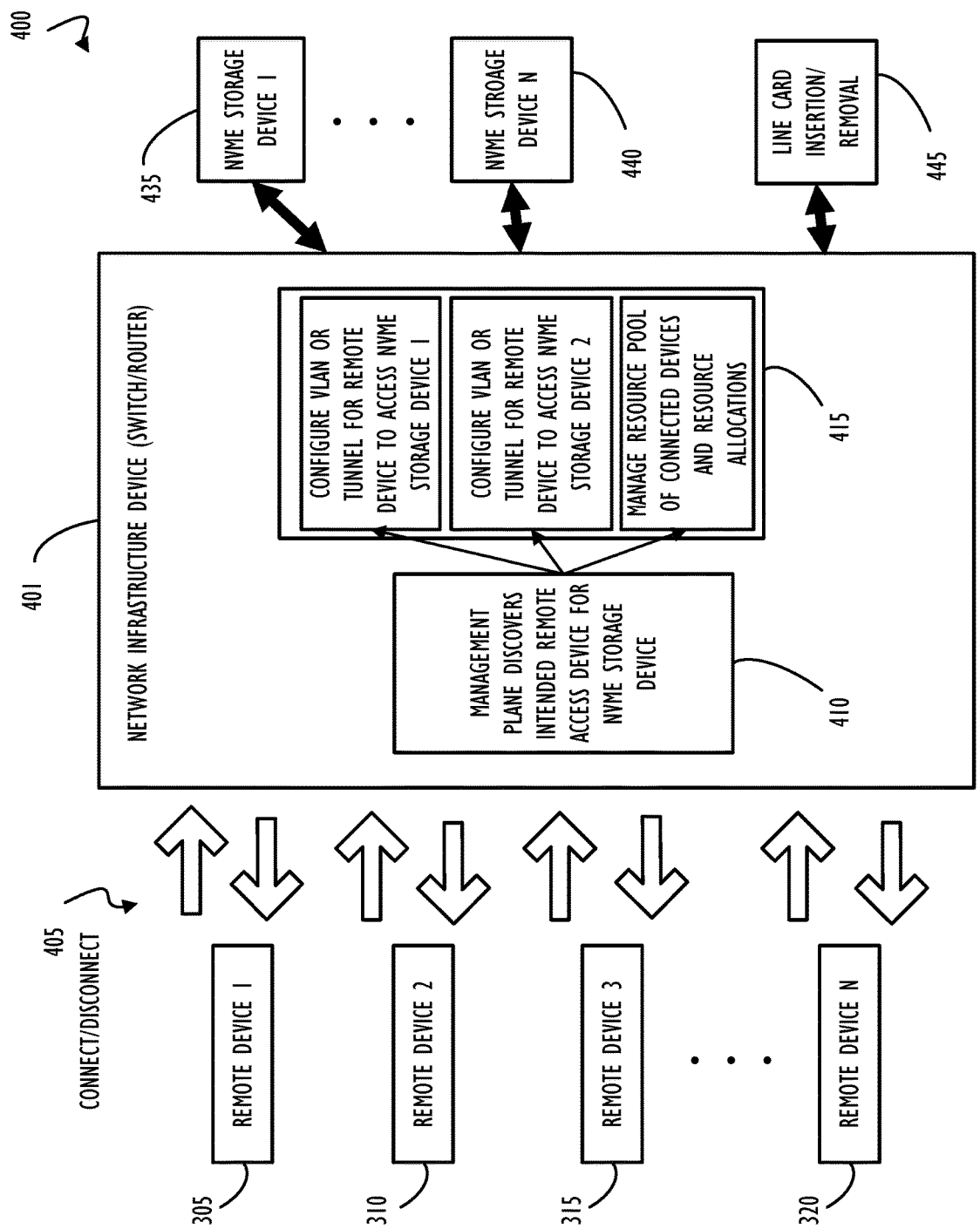
FIG. 4 is a block diagram representing a high-level example view of remote devices and storage capability being added to or removed from (e.g., allocated or de-allocated) those remote devices and managed as a resource pool within a network infrastructure device, according to one or more disclosed implementations.

Referring to FIG. 4, shown is a block diagram of a high-level example view 400 of remote devices and resources. View 400 includes directional arrows to illustrate examples of connecting and disconnecting devices and resources to network infrastructure device 401. As illustrated in example view 400, resources may be added to (or removed from) network infrastructure device 401. Resources in the form of additional line cards or line cards configured with integrated storage may be added to (e.g., plugged in) or removed from (e.g., physically removed or disabled) network infrastructure device 100 at run-time. In some example implementations (e.g., as shown in FIG. 2A and FIG. 2B) a high-availability switch may include components that are "hot pluggable" with respect to network infrastructure device 401. In this context, hot pluggable refers to the situation where components may be added to a system while the system is running and not necessitate a restart of the network infrastructure device to make those newly attached resources available for use. This type of implementation is typical for high-availability applications where down-time may not be desirable (e.g., no down-time to implement a configuration change). For example, cloud-based resources may be configured to provide near perfect uptime for consumers and thus should not be rebooted for minor configuration changes. Accordingly, disclosed techniques for auto-provisioning of resources may further assist administration goals of run-time availability by allowing augmentation of resources "on the fly" at run-time.

As illustrated in example view 400, connect/disconnect arrows 405 indicate that remote devices (305-320) may establish a network connection with network infrastructure device 401. Further, after communication is established between a remote device (e.g., remote devices 305-320), a discovery process may execute to identify configuration options for a remote device collectively working with other network devices. Portions of a discovery process may be initiated from either the remote device or network infrastructure device and may work with other local functional modules and remote functional modules to determine configuration options. Once determined, a client application executing on network infrastructure device 401 may automatically provision resources for use by the remote device. That is, a collective exchange of information may take place between a newly connected remote device and network infrastructure device 401. This collective exchange of information may be referred to as "discovery" and may include components supplying configuration information from both of the remote device and network infrastructure device 401. Once discovery is complete, a client application executing on network infrastructure device 401 may make available resources to satisfy the attributes of as provided by the configuration information. As illustrated in FIG. 4, network infrastructure device 401 may include functional modules 410 as part of a management plane of a network switch. Functional modules 410 may work with other configuration modules 415 to automatically provision communication paths and manage resources available to network infrastructure device 401.

Example view 400 also includes integrated components or external devices that may be connected to network infrastructure device 401 in accordance with one or more disclosed implementations. Specifically, one or more NVMe storage devices, as illustrated by NVMe storage device 1 (435) through NVMe storage device N (440) may be added to network infrastructure device 401. The bidirectional arrow between NVMe storage device 1 (435) and network infrastructure device 401 is intended to illustrate that the connection between network infrastructure device 401 and NVMe storage device 1 (435) is both bi-directional and that the connection may be transient in that NVMe storage device 1 (435) may be plugged into (or removed) from network infrastructure device 401 at run-time. Of course, it is more likely that resources will be added to network infrastructure device 401 at run-time and be made available through auto-provisioning rather than removing capabilities, Removal of capabilities may require additional actions to ensure no impact to remote devices that may be using said resources. Specifically, if removal of components is planned ahead of time, reliance on components to be removed may be reduced or eliminated such that their removal does not impact remote device functionality. In any case, as illustrated by configuration modules 415 management of resource pools and allocation to connected devices may be performed as part of the functionality of network infrastructure device 401. In addition to storage devices, example view 400 illustrates that line card 445 may be inserted or removed from network infrastructure device 401 at run-time. Thus, a line card (possibly including SSD capability) may be plugged into a running network infrastructure device 401 to increase its resource pools. This type of run-time augmentation may allow system administrators to add capabilities as part of an overall HCI solution.

Figure 5:
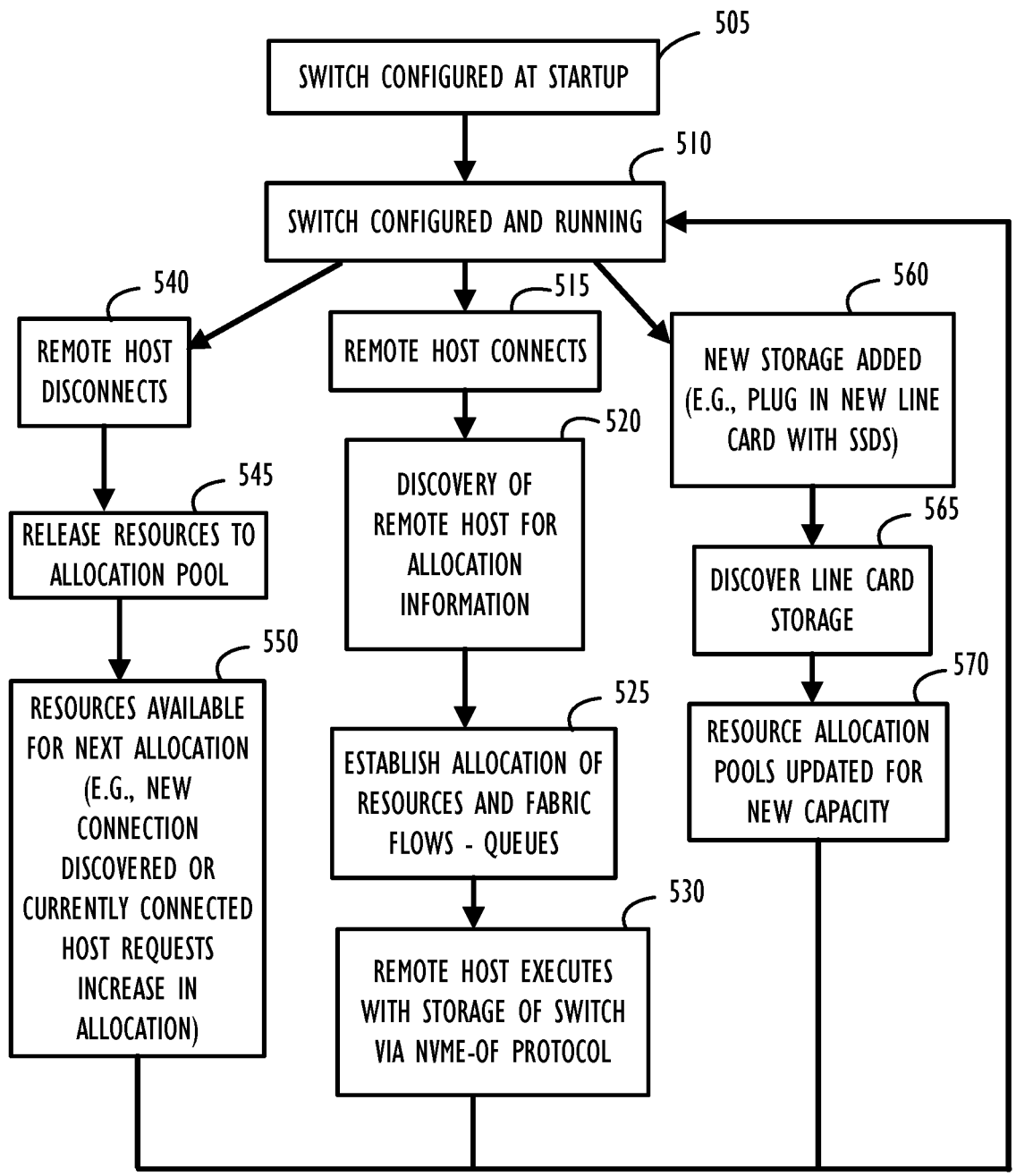
FIG. 5 is an example process flow diagram depicting an example of the logic applied for automatically identifying and routing communication paths to support dynamic allocations of resources using NVMe-oF network packets, according to one or more disclosed implementations.

Referring to FIG. 5, a process flow diagram depicting an example of logic that may be performed by one or more functional modules to automatically provision storage resources for a network infrastructure device (e.g., network infrastructure device 401 discussed above). The logic may be implemented in software, firmware, hardware logic, or a combination thereof and may be used to implement a method 500 as reflected in the process flow diagram of FIG. 5, Example method 500 begins at block 505 where a network infrastructure device (e.g., a switch with integrated SSD storage capability) is configured at startup. Flow continues to block 510 where the switch operates to provide network connectivity between other devices connected to a network. In example method 500, there are three distinct examples of actions that may affect (or be detected by) the network switch in normal operation. Other possibilities exist, but three options are enumerated in example method 500. Specifically, A) block 515 indicates that a remote host (e.g., a remote device desiring network provided storage) connects to the network switch; B) block 540 indicates that a remote host (that may have been previously allocated storage capacity of the switch) disconnects from the network switch; and C) block 560 indicates that new resources (e.g., more storage capacity, a new communication line card, or both) are plugged into (added) to augment available resources of the network switch.

Continuing from block 515 where a remote host connects, block 520 indicates that a discovery function may execute on the network switch (and possibly have components execute on the remote device) to determine allocation information (e.g., auto provisioning of resource information) on behalf of the remote device (e.g., remote device 1 (305) of FIGS. 3-4). A remote host may also poll a network switch device to determine what resources are available from the network switch. For example, at startup a remote device may attempt to determine (e.g., via polling) what resources are available for use by the remote device when it becomes fully operational, This polling may be considered similar to functions performed by a device at startup when it attempts to discover what device capabilities exist on the device being booted. Block 525 indicates that a client application, executing on the network switch for example, may establish allocation of resources (e.g., from a resource pool of the network switch), fabric flows, data communication queues, storage, etc. to support resource provisioning for the remote device. Specifically, the client application executing on the switch may perform functions described with respect to blocks 410 and 415 of FIG. 4 and establish dedicated communication paths between the newly connected remote device and available resources such as storage. Block 530 indicates that the remote host (e.g., remote device) may execute using storage provided by the network switch using one or more NVMe-oF protocol to interface to storage devices. Flow from this branch then returns to block 510 where the network switch continues in operational mode to support all configured capability (including the newly allocated capability for the remote host connection of block 515).

Continuing from block 540 of example method 500 a remote host may disconnect from the network switch (or may simply relinquish resources that are no longer in-use). Block 545 indicates that released resources (e.g., storage capacity) may be returned to an allocation pool of resources as managed by functional modules executing on the network switch. Block 550 indicates that relinquished resources may be made available to satisfy additional requests made on behalf of this same remote host (e.g., remote device of FIG. 3) or a different remote device. In summary, the branch between block 540 and 550 may return resources to a resource pool as managed by a network switch providing resources to other network devices and flow returns to block 510 where the network switch continues in operational mode.

Continuing from block 560 as the third branch of example method 500, new capability may be added to a network switch. As explained above, this new capability may be added while the network switch is operational such that existing resources that are allocated to other remote devices remain available without interruption of services. New capability may be in form of additional capacity (e.g., storage or network ports) made available by inserting a line card into a network switch. Other possibilities exist for augmenting capability of a network switch. In general, block 560 represents an augmentation of resources for the network switch so that resources are increased at run-time. Block 565 indicates that a client application executing on the network switch may recognize the new line card, for example, and any resources available on that line card. Block 570 indicates that new augmented resources may be added to resource pools as managed by the network switch and used to satisfy further requests on behalf of current or additional remote devices (also referred to in this example as remote hosts). Again, flow returns from block 570 to block 510 where the network switch continues in operational mode.

Figure 6:
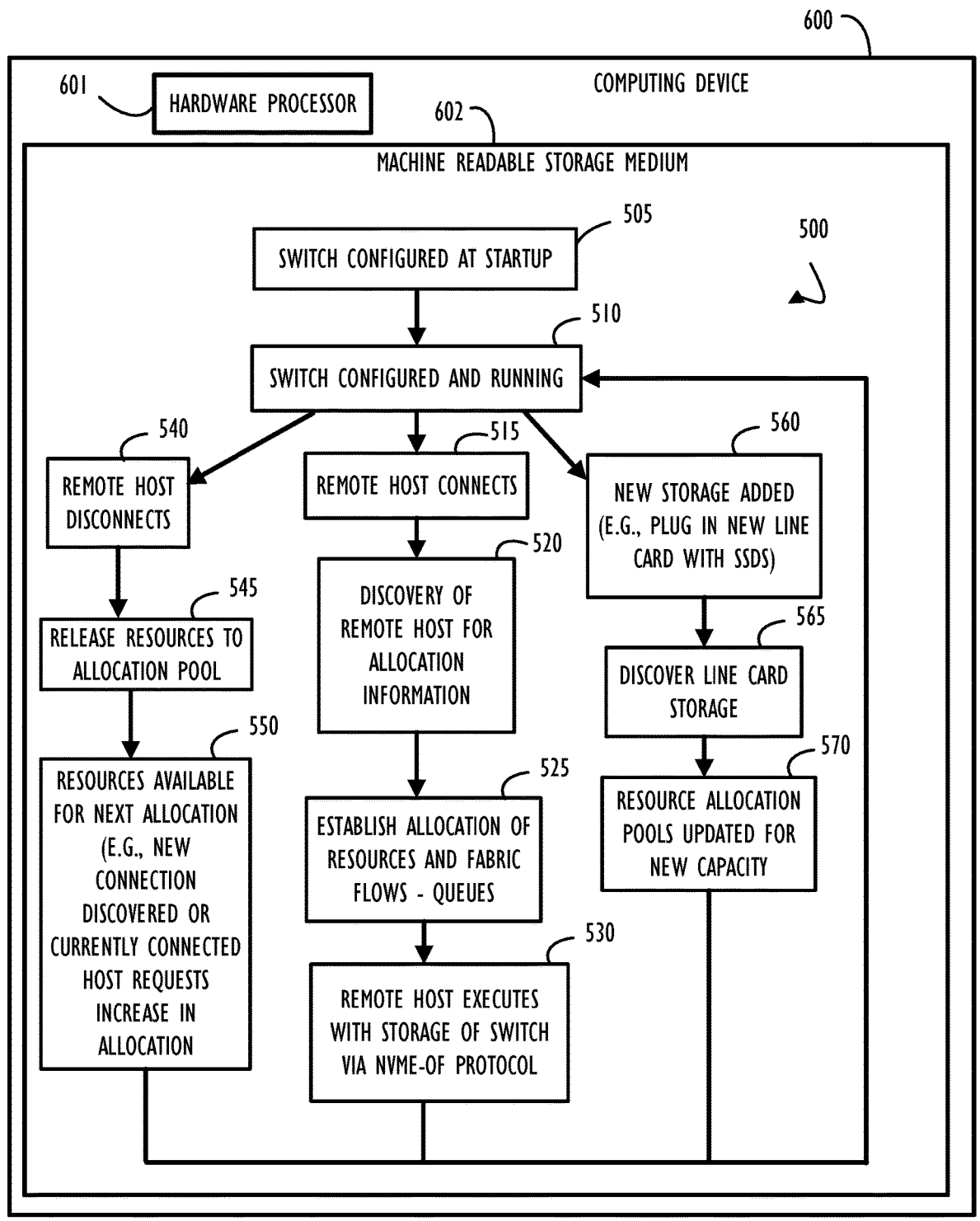
FIG. 6 is an example computing device, with a hardware processor, and accessible machine-readable instructions stored on a machine-readable medium that may be used to perform automatic NVMe-oF storage protocol allocation and de-allocation of resources for a network infrastructure device (and remote devices), according to one or more disclosed implementations.

Referring now to FIG. 6, shown is an example computing device 600, with a hardware processor 601, and accessible machine-readable instructions stored on a machine-readable medium 602 that may be used to perform automatic NVMe-oF storage provisioning for a network switch, according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In this example of FIG. 6, machine-readable storage medium 602 includes instructions to cause hardware processor 601 to perform blocks 505-570 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
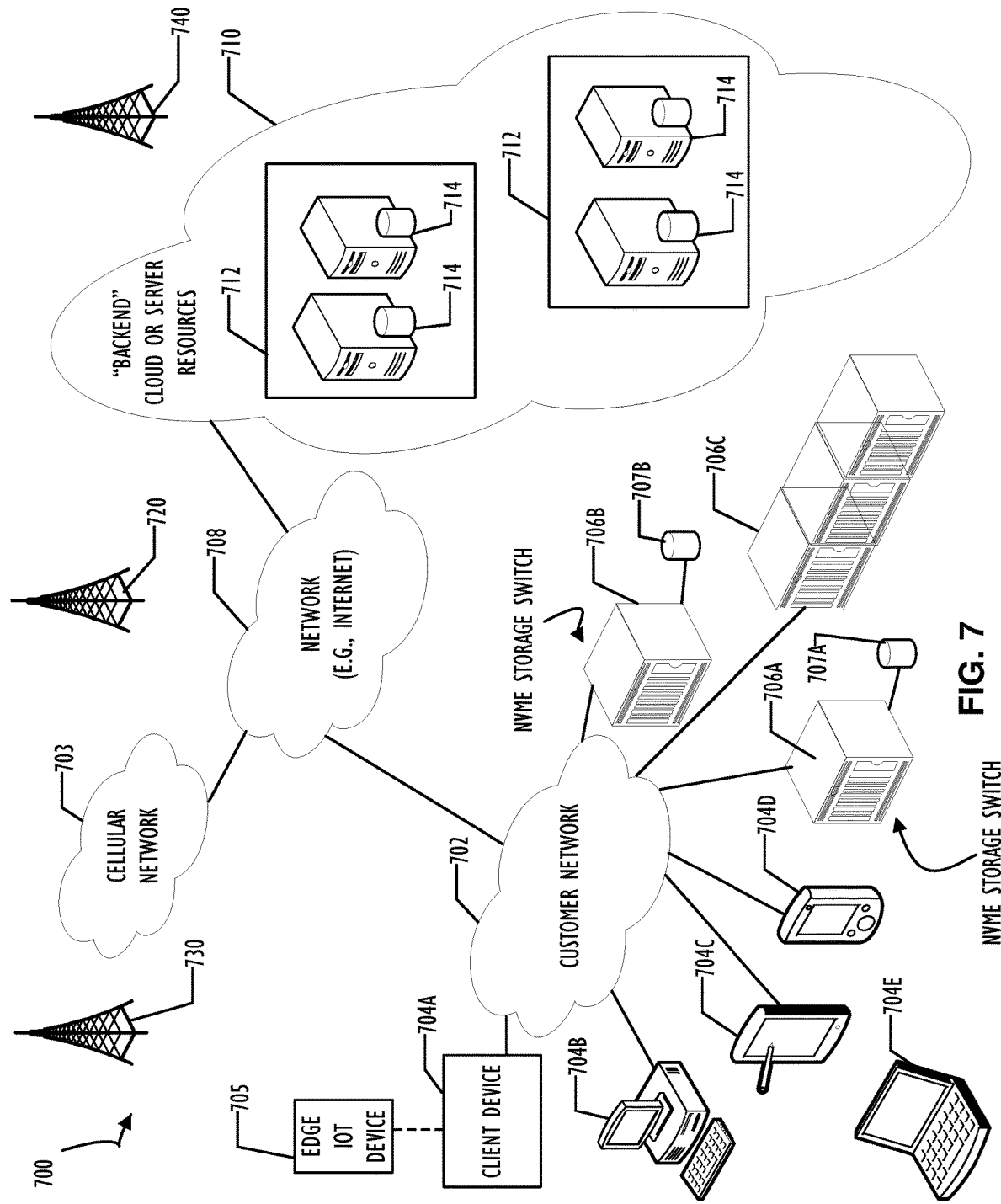
FIG. 7 represents a computer network infrastructure that may be used to implement all or part of the disclosed automatic NVMe-oF storage capability for a network infrastructure device (e.g., an NVMe-oF storage switch), according to one or more disclosed implementations.

FIG. 7 represents a computer network infrastructure 700 that may be used to implement all or part of the disclosed automatic NVMe-oF storage provisioning techniques, according to one or more disclosed embodiments. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability switches or network devices using methods and techniques such as those described above to automatically provision storage resources based on the NVMe-oF protocols.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices that implement a network switch augmented with NVMe storage devices (e.g., SSDs). Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 8:
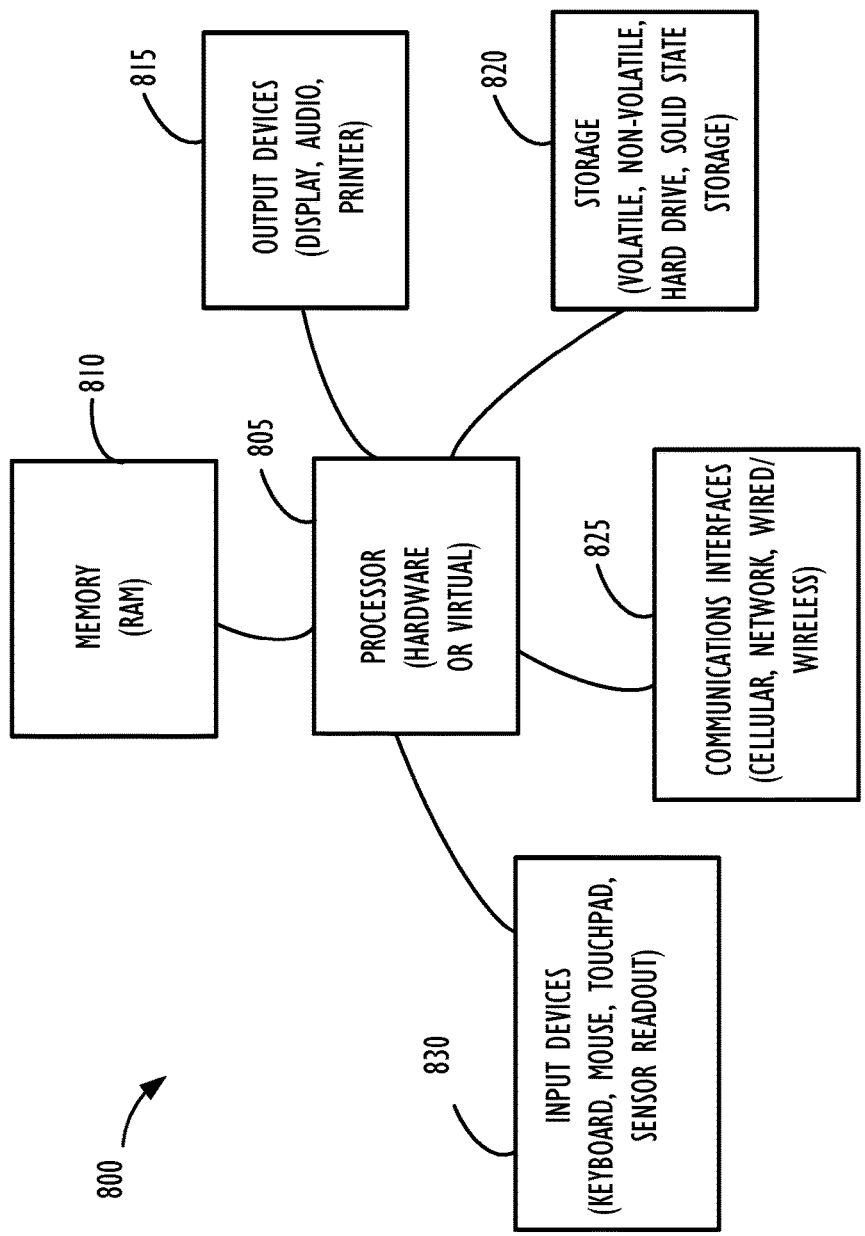
FIG. 8 illustrates a computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3(L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code, For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections, The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A method, comprising:
implementing, at a switch, a network protocol stack facilitating communication with another switch;
detecting, at the switch, an intended path in a network between a remote device and a non-volatile memory express (NVMe) storage device prior to the intended path being configured at the remote device, wherein the intended path is detected based on an NVMe over fabric (NVMe-oF) protocol; and
based on the detected intended path, automatically configuring parameters on the switch to provide a connectivity path in the network between the remote device and the NVMe storage device, wherein the connectivity path corresponds to at least one of a virtual local area network (VLAN) and a communication tunnel.

2. The method of claim 1, wherein detecting the intended path between the remote device and the NVMe storage device is responsive to a startup sequence or a polling for storage devices performed by the remote device.

3. The method of claim 1, further comprising executing a client application on the switch for detecting the intended path and automatically configuring the parameters.

4. The method of claim 3, wherein the client application is implemented using a combination of software, firmware, and hardware logic of the switch.

5. The method of claim 1, further comprising:
performing configuration information exchange between a client application executing on the switch and the remote device, wherein the client application manages resource pools available on the switch and allocates resources responsive to requests received from the remote device.

6. The method of claim 5, wherein the client application manages resources for the remote device and at least one other remote device, wherein the remote device and the at least one other remote device utilize the NVMe-oF protocol.

7. The method of claim 1, wherein the NVMe storage device is a solid-state storage device (SSD) integrated into a line card of the switch.

8. The method of claim 7, wherein the switch is a high-availability switch comprising multiple SSDs configured as redundant pairs of SSDs for the high-availability switch, wherein the redundant pairs of SSDs are configured to prevent a single point of failure with respect to storage provided by the high-availability switch.

9. The method of claim 8, wherein a first SSD of a first redundant pair of the redundant pairs of SSDs is integrated within a first line card of the high-availability switch and a second SSD of the first redundant pair is integrated within a second line card of the high-availability switch.

10. A switch, comprising:
a processor;
a plurality of solid state storage drives (SSDs) integrated into one or more line cards communicatively coupled to the processor; and
a memory communicatively coupled to the processor and storing instructions executable by the processor, wherein the instructions executable by the processor, when executed, cause the processor to:
implement, at the switch, a network protocol stack facilitating communication with another switch;
detect an intended path in a network between a remote device and a non-volatile memory express (NVMe) storage device prior to the intended path being configured at the remote device, wherein the intended path is detected using a NVMe over fabric (NVMe-oFl protocol; and
based on the detected intended path, automatically configure parameters on the switch to provide a connectivity path in the network between the remote device and the NVMe storage device, wherein the connectivity path corresponds to at least one of: a virtual local area network (VLAN) and a communication tunnel.

11. The switch of claim 10, wherein the switch is a high-availability switch comprising a plurality of SSDs configured as redundant pairs of SSDs, wherein the redundant pairs of SSDs are configured to prevent a single point of failure with respect to storage provided by the high-availability switch.

12. The switch of claim 11, wherein a first SSD of a first redundant pair of the redundant pairs of SSDs is integrated within a first line card of the high-availability switch and a second SSD of the first redundant pair is integrated within a second line card of the high-availability switch.

13. The switch of claim 10, wherein the instructions executable by the processor, when executed, further cause the processor to:
detect a second intended path in the network between a second remote device and an NVMe storage device using the NVMe-oF protocol; and
automatically configure parameters on the switch to provide a second connectivity path in the network between the second remote device and the second NVMe storage device, wherein the second connectivity path corresponds to at least one of: a second virtual local area network (VLAN) and a second communication tunnel.

14. The switch of claim 10, wherein the instructions executable by the processor, when executed, further cause the processor to:
perform configuration information exchange between a client application executing on the switch and the remote device, wherein the client application manages resource pools available on the switch and allocates resources responsive to requests received from the remote device.

15. The switch of claim 10, wherein the NVMe-oF protocol supports one or more of: NVMe over remote direct memory access (RDMA) (NVMe/RDMA), NVMe over Fibre Channel (NVMe/FC), and NVMe over transport control protocol (TCP) (NVMe/TCP).

16. A non-transitory computer readable medium comprising instructions stored thereon that, when executed by a processor of a switch, cause the switch to:
implement, at the switch, a network protocol stack facilitating communication with another switch;

detect an intended path in a network between a remote device and a non-volatile memory express (NVMe) storage device prior to the intended path being configured at the remote device, wherein the intended path is detected using a NVMe over fabric (NVMe-oF) protocol; and based on the detected intended path, automatically configure parameters on the switch to provide a connectivity path in the network between the remote device and the NVMe storage device, wherein the connectivity path corresponds to at least one of: a virtual local area network (VLAN) and a communication tunnel.

17. The non-transitory computer readable medium of claim 16, wherein the switch is a high-availability switch comprising a plurality of SSDs configured as redundant pairs of SSDs, wherein the redundant pairs of SSDs are configured to prevent a single point of failure with respect to storage provided by the high-availability switch.

18. The non-transitory computer readable medium of claim 17, wherein a first SSD of a first redundant pair of the redundant pairs of SSDs is integrated within a first line card of the high-availability switch and a second SSD of the first redundant pair is integrated within a second line card of the high-availability switch.

19. The non-transitory computer readable medium of claim 17, wherein the NVMe-oF protocol supports one or more of: NVMe over remote direct memory access (RDMA) (NVMe/RDMA), NVMe over Fibre Channel (NVMe/FC), and NVMe over transport control protocol (TCP) (NVMe/TCP).

20. The non-transitory computer readable medium of claim 16, wherein the instructions executable by the switch, when executed, further cause the switch to:

perform configuration information exchange between a client application executing on the switch and the remote device, wherein the client application manages resource pools available on the switch and allocates resources responsive to requests received from the remote device.

* * * * *